April 6, 1937.  L. M. GOLDSMITH  2,075,844

CUSHIONING MEANS FOR SUPPORTING A BODY UPON A VEHICLE FRAME

Filed April 12, 1934    2 Sheets-Sheet 1

Inventor
Lester M. Goldsmith
By J. Wallace Quinn
his Attorney

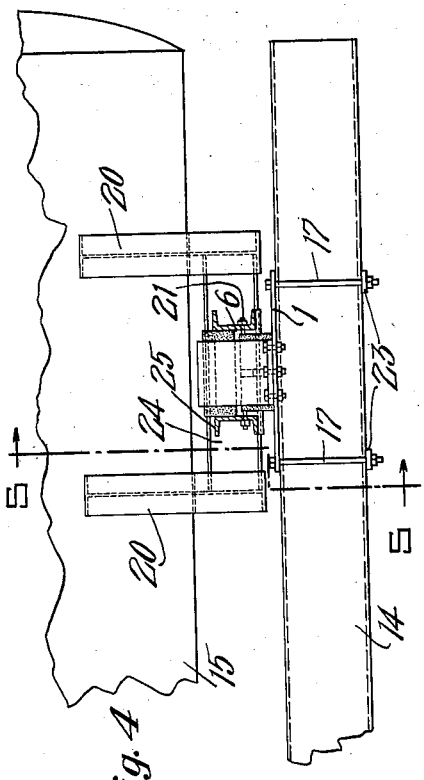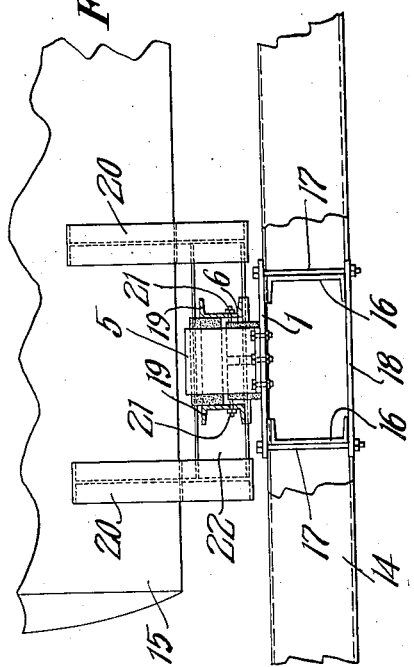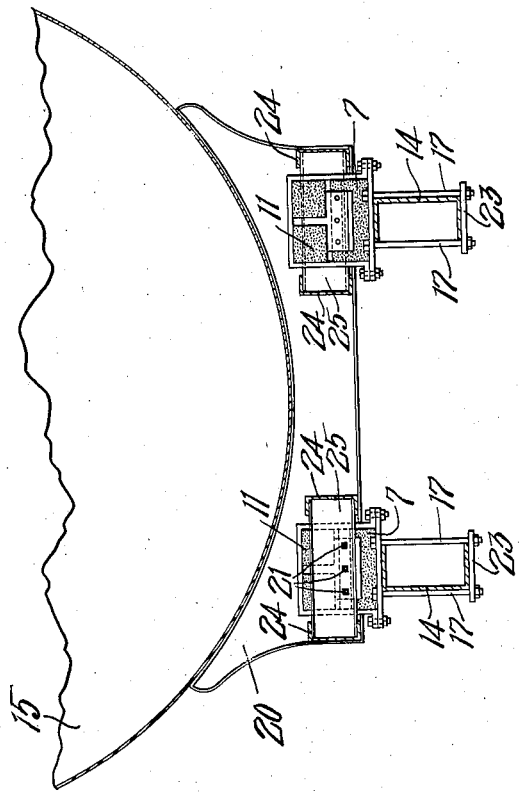

Patented Apr. 6, 1937

2,075,844

UNITED STATES PATENT OFFICE 2,075,844

CUSHIONING MEANS FOR SUPPORTING A BODY UPON A VEHICLE FRAME

Lester M. Goldsmith, Philadelphia, Pa., assignor to The Atlantic Refining Company, Philadelphia, Pa., a corporation of Pennsylvania Application April 12, 1934, Serial No. 720,298

4 Claims. (Cl. 248—358)

This invention relates to improvements in vehicle body mountings and more particularly to cushioning mountings for truck tanks.

This invention contemplates an improved cushioning mounting interposed between the tank and chassis frame of a tank truck to damp any stresses and strains which are set up in the tank due to shifting of the liquid therein or caused by the chassis frame itself when the truck is passing over uneven road surfaces. It is known to place a plurality of bracket supported housings containing molded rubber blocks therein, between the chassis frame and the tank, with the ends of the transverse bolsters which form a part of the tank body support, imbedded in the rubber block so that any stresses and strains set up due to the aforementioned causes are damped by the yielding action of the rubber and are not transmitted from the chassis frame to the tank body or vice versa. Many disadvantages are found in the prior inventions due to the number of mountings per truck required, their complexity, the relatively expensive construction and the difficulty of replacement.

An object of my invention is to provide an improved cushioning mounting fixture that will yieldingly resist or compensate for stresses and strains set up in any direction in the chassis frame or tank mounted thereon. Another object of my invention is to provide a cushioning mounting which is relatively simple and inexpensive in construction. Another object is to provide a mounting, the replacement or interchangeability of which will be considerably facilitated. A further object is to provide a mounting in which there is no metallic connection between the chassis frame and tank supported thereon. A still further object of my invention is to provide a mounting of such rugged construction that there will be required the fewest number of such mountings to substantially support the tank and effectively carry out the other objects set forth hereinabove.

The preferred embodiment of my invention is described in the following specification where reference is made to the accompanying drawings, in which:

Fig. 4 is a side elevation (partly broken away) of a tank and chassis frame equipped with mounting fixtures embodying the invention; and Fig. 5 is a section on the line 5—5 of Fig. 4.

Figure 1:
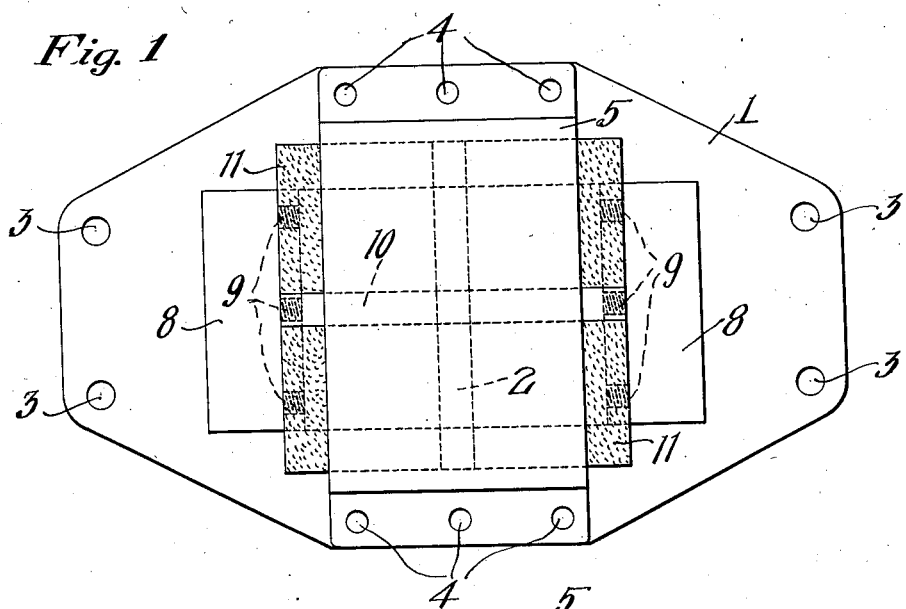
Fig. 1 is a plan view of the assembled mounting fixture.
Figure 2:
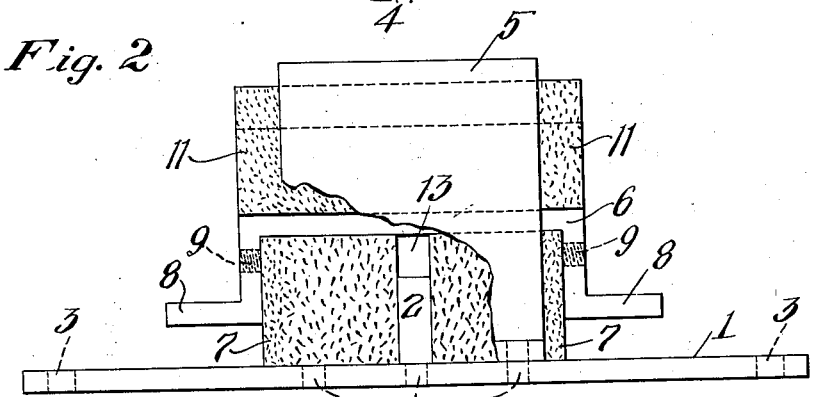
Fig. 2 is a side elevation of the assembled mounting fixture.
Figure 3:
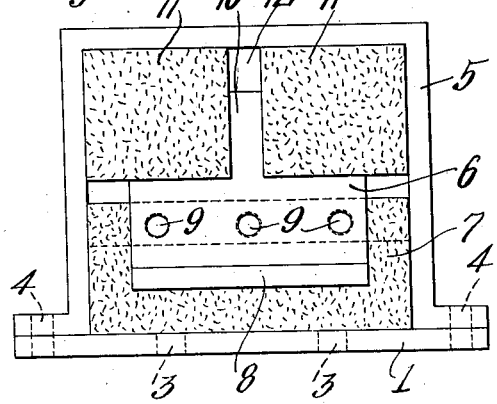
Fig. 3 is an end elevation of the assembled mounting fixture.

Referring to Figs. 1 to 3, 1 is a metal base plate having a web 2 extending perpendicularly therefrom. Holes 3 and 4 in the plate 1 permit bolting of the plate 1 to the chassis and housing member 5 respectively. A saddle 6 embraces under compression, rubber blocks 7 disposed on either side of the web 2. Shoulders 8 of the saddle 6 are supports for the underframing of the tank. Threaded holes 9 in the saddle 6 permit bolting of the tank underframing thereto, as for example, by means of bolts 21 (see Figs. 4 and 5), threadedly engaging said holes 9 and terminating adjacent the inner sides of saddle 6 (see Figs. 2 and 4). The saddle 6 is provided with a web 10 which extends perpendicularly therefrom and cross-wise to web 2 when the saddle 6 is set in place. On either side of web 10 are rubber blocks 11 which extend cross-wise to the rubber blocks 7 and are held in place under compression by the housing 5 which when the mounting fixture is assembled, is rigidly fastened to plate 1, for example, by bolts through holes 4, secured by nuts (see Figs. 4 and 5). Spaces 12 and 13 provide room for expansion of the rubber blocks 11 and/or 7 while under compression.

Referring now to the left end of Fig. 4, 14 is the chassis frame which extends longitudinally of the tank 15 and is centered with respect to a longitudinal median line of the tank. Channel irons 16 which extend transversely to the chassis frame 14 are supported on the inwardly turned flanges thereof and secured thereto in any suitable manner. The base 1 of a single mounting fixture is held rigidly to the channel irons 16 by means of the bolts 17 which pass through holes 3 of base plate 1 (see Fig. 2) and through holes in a plate 18 which spans the under portion of the channel irons 16. Transverse channel irons 19 which have their flanges turned outwardly are spaced equally with respect to a transverse center line between the tank supports 20 to rest on the ledges 8 and fit snugly to the sides of the saddle 6 (see Fig. 2) and be bolted thereto by the bolts 21. The channel irons 19 are held securely in any suitable manner to the longitudinal channel irons 22 (only one of which is shown) which in turn are attached securely to the tank supports 20 in any suitable manner.

Having reference now to the right end of Fig. 4 and to Fig. 5, the bases 1 (see Figs. 2 and 3) of the rear mounting fixtures are held in place on the chassis frame 14 by means of the bolts 17 passing through holes 3 of said base plate and through holes in the metal straps 23 placed at the under side of the chassis frame. Spaced equally on either side of the vertical center line through the chassis frame 14 are channel irons 24 with inwardly turned flanges which are secured in any suitable manner to the tank supports 20. In Fig. 4, only one of these members 24 is shown. Spaced equally on either side of a transverse center line between the supports 20 and secured in any suitable manner to channel members 24 are channel irons 25 which extend transversely with their flanges turned outwardly and which are spaced so that they rest on the shoulders 8 of the mounting fixture and their backs fit snugly to the sides of the saddle 6 (see Fig. 2) and are bolted thereto by means of bolts 21. Channel irons 24 are secured in any suitable manner to the tank supports 20 with their flanges turned inwardly. With the mountings thus attached the tank is supported at three points on the rubber blocks 7 (see Figs. 2 and 3) and motion in any direction of the tank with respect to the chassis is yieldingly restricted by the bearing action of the webs 2 and 10, and the housing 5 and base plate 1 on the rubber blocks 11 and 7.

It has been shown in the foregoing description that no metallic connection exists between the tank and chassis frame so that while the truck passes over uneven road surfaces the stresses set up either by the chassis or in the tank are not transmitted from the chassis to the tank or vice versa due to the yielding action of the rubber blocks which separate the said parts. The use of but three of my mountings per truck has proven very effective both in supporting the tank and dampening or eliminating entirely stresses which are set up. The number of parts, their simple construction and the mode of attachment or detachment of my mounting have proven to be relatively simple and economical.

I do not wish to be limited to the embodiment of my invention herein described and illustrated since many modifications may be made within the scope of this invention.

I claim:

1. A cushion supporting device, which comprises a horizontal base, a web affixed to and extending upwardly from said base, cushioning means resting upon said base and engaging opposite sides of said web, a saddle member adapted for connection to a member to be supported, resting upon and partly confining said cushioning means, and held thereby out of contact with said web and base, a second web affixed to and extending from said saddle member, said second web being disposed above and at an angle to and out of contact with the web first mentioned, cushioning means resting upon said saddle member and engaging opposite sides of said second web, and a housing member extending from said base around and partly confining said first and second mentioned cushioning means.

2. A cushion-supporting device which comprises a plate, a web affixed to and extending from said plate, cushioning members disposed on said plate on each side of said web, a saddle engaging and partly confining said cushioning members, a second web affixed to and extending from said saddle and out of contact with and at an angle to the first mentioned web, cushioning members disposed on said saddle on each side of said second web, and a housing embracing said last mentioned cushioning members, said saddle being out of contact with said plate and said housing.

3. A cushion-supporting device which comprises a plate, a web extending centrally from and affixed to said plate, cushioning members disposed on said plate on each side of said web, a saddle resting upon and partly confining said cushioning members, a second web extending centrally from and affixed to said saddle and arranged above and out of contact with and at substantially right angles to the first mentioned web, cushioning members disposed on said saddle on each side of said second web, and a housing embracing said last mentioned cushioning members, said saddle being out of contact with said plate and said housing.

4. A cushion-supporting device comprising a horizontal base, a plate extending vertically from said base, resilient non-metallic cushions disposed on said base on each side of said plate, a saddle member supported on said cushions, said saddle member having turned-down flanged shoulders adapted to maintain the cushions adjacent the aforesaid plate and adapted for connection to a member to be supported, said saddle member being provided with a plate extending vertically therefrom and substantially at right angles to the first mentioned plate, resilient non-metallic cushions disposed on said saddle member on each side of said plate and substantially at right angles to the first mentioned cushions, and a housing member partly confining said cushions, and adapted to be rigidly connected to said base.

LESTER M. GOLDSMITH.